(12) United States Patent
Fontana et al.

(10) Patent No.: US 9,747,045 B2
(45) Date of Patent: Aug. 29, 2017

(54) SUB-SECTOR WEAR LEVELING IN MEMORIES

(71) Applicant: MICRON TECHNOLOGY, INC., Boise, ID (US)

(72) Inventors: Marco Giovanni Fontana, Milan (IT); Massimo Montanaro, Cava Manara (IT); Anthony R. Cabrera, Folsom, CA (US); Gerald A. Kreifels, El Dorado Hills, CA (US)

(73) Assignee: Micron Technology, Inc., Boise, ID (US)

(*) Notice: Subject to any disclaimer, the term of this patent is extended or adjusted under 35 U.S.C. 154(b) by 24 days.

(21) Appl. No.: 14/935,746

(22) Filed: Nov. 9, 2015

(65) Prior Publication Data
US 2016/0062683 A1    Mar. 3, 2016

Related U.S. Application Data

(63) Continuation of application No. 14/013,867, filed on Aug. 29, 2013, now Pat. No. 9,195,590.

(51) Int. Cl.
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0649* (2013.01); *G06F 3/0679* (2013.01); *G06F 12/0246* (2013.01); *G06F 12/0253* (2013.01); *G06F 2212/7211* (2013.01)

(58) Field of Classification Search
CPC ...... G06F 3/0616; G06F 3/064; G06F 3/0649; G06F 3/0679; G06F 12/0246; G06F 12/0253; G06F 2212/7211
See application file for complete search history.

(56) References Cited

U.S. PATENT DOCUMENTS

| | | | |
|---|---|---|---|
| 2004/0083335 A1 | 4/2004 | Gonzalez et al. | |
| 2007/0294490 A1 | 12/2007 | Freitas et al. | |
| 2008/0219053 A1* | 9/2008 | Kim | G11C 16/0483 365/185.11 |
| 2009/0271567 A1 | 10/2009 | Huang | |
| 2011/0138103 A1* | 6/2011 | Iiiadis | G06F 12/0246 711/103 |
| 2011/0145483 A1 | 6/2011 | Sudo | |
| 2012/0311237 A1 | 12/2012 | Park | |
| 2013/0080689 A1* | 3/2013 | Jo | G06F 12/0246 711/103 |
| 2013/0166818 A1* | 6/2013 | Sela | G06F 12/0246 711/103 |

(Continued)

*Primary Examiner* — Hal Schnee
(74) *Attorney, Agent, or Firm* — Dicke, Billig & Czaja, PLLC (57) ABSTRACT

Methods of wear leveling in a memory, and memories configured to perform such methods, are useful in extending cycling endurance in memories. Such methods include transferring data from a first block of the memory to a second block of the memory, erasing the first block, transferring data from a third block of the memory to the first block, erasing the third block, transferring data from the second block to the third block, swapping logical addresses for the first block and the third block with each other, and erasing the second block. Transferring data from the third block to the first block excludes a sub-sector of the third block that is to be erased.

20 Claims, 8 Drawing Sheets

(56) References Cited

U.S. PATENT DOCUMENTS

| | | | |
|---|---|---|---|
| 2013/0198439 A1* | 8/2013 | Kurotsuchi | G06F 12/0246 |
| | | | 711/103 |
| 2014/0063902 A1 | 3/2014 | Sunkavalli et al. | |
| 2014/0063938 A1* | 3/2014 | Oh | H01L 27/11524 |
| | | | 365/185.02 |
| 2014/0133232 A1 | 5/2014 | Avila et al. | |
| 2014/0181370 A1* | 6/2014 | Cohen | G06F 12/0246 |
| | | | 711/103 |
| 2014/0325148 A1 | 10/2014 | Choi et al. | |

* cited by examiner

SUB-SECTOR WEAR LEVELING IN MEMORIES

RELATED APPLICATIONS

This application is a Continuation of U.S. patent application Ser. No. 14/013,867filed Aug. 29, 2013, now U.S. Pat. No. 9,198,590, issued on Nov. 24, 2015, which is commonly assigned and incorporated herein by reference in its entirety.

TECHNICAL FIELD

The present embodiments relate generally to memory devices and a particular embodiment relates to wear leveling in memory devices.

BACKGROUND

Memory devices (which are sometimes referred to herein as "memories") are typically provided as internal, semiconductor, integrated circuits in computers or other electronic systems. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of a charge storage structure, such as floating gates or trapping layers or other physical phenomena, determine the data state of each cell. Common electronic systems that utilize flash memory devices include, but are not limited to, personal computers, personal digital assistants (PDAs), digital cameras, digital media players, digital recorders, games, appliances, vehicles, wireless devices, cellular telephones, and removable memory modules, and the uses for flash memory continue to expand.

Flash memory typically utilizes one of two basic architectures known as NOR flash and NAND flash. The designation is derived from the logic used to read the devices. In NOR flash architecture, a string of memory cells is coupled in parallel with each memory cell coupled to a data line, such as those typically referred to as digit (e.g., bit) lines. In NAND flash architecture, a string of memory cells is coupled in series with only the first memory cell of the string coupled to a bit line.

As the performance and complexity of electronic systems increase, the requirement for additional memory in a system also increases. However, in order to continue to reduce the costs of the system, the parts count must be kept to a minimum. This can be accomplished by increasing the memory density of an integrated circuit by using such technologies as multilevel cells (MLC). For example, MLC NAND flash memory is a very cost effective non-volatile memory.

As cells in a memory are cycled more and more times, their performance can be affected. For example, some cells will program or read differently if they have been cycled a large number of times. Also, data retention time can be affected for cells that have been cycled a large number of times. To reduce cycling issues, many memories use a process called wear leveling on blocks of a memory. Wear leveling ensures that all blocks get programmed and erased a similar number of times, over time. Program and erase cycles are distributed over all blocks of the memory, so that each block is stressed about the same, as opposed to one block being overly stressed while another is minimally stressed. Wear leveling virtually extends cycling endurance in memories. In a block swap, when a block reaches a certain wear amount, for example a pre-determined program/erase cycle count based, a subsequent erase request triggers a swap of the block logical addresses with a low cycle count block. If the block to be swapped for the high cycle count block is not empty, such a swap requires two erase phases.

Swap functionality is implemented, for example, using a programmable hardware device called a block mapping unit (BMU) that is in the address path of the memory. The BMU manages logical addresses for the memory, and logical address remaps. Each physical block of the memory has a memory area dedicated to a program/erase cycle count. At each erase event, a physical block that is being cycled is checked for wear leveling necessity. When wear leveling is indicated, a swap of the block to be wear leveled is made with a low-cycled block, and logical re-mapping is performed by the BMU. Wear leveling is hidden, so some programmable part of the memory and software is typically dedicated to power loss management, allowing an aborted wear leveling operation to be recovered at the next power-up.

In typical memories, hierarchy stops at the block level. It is not possible to erase a section smaller than a block. Some new memories (e.g., page flash memories) are erasable on a level smaller than a block. For example, a sub-sector of a block is erasable in some memories. However, in such memories, the sub-sectors in a block consist of a subset of the block's word lines and share the same physical columns, but have separate program/erase access. As such, each sub-sector also has separate cycling and wear statistics. In page flash memories, each access in a program/erase operation to a sub-sector produces some effect on the other sub-sectors sharing the same block, in terms of data integrity. This data degradation affects wear leveling on the sub-sector level.

For the reasons stated above and for other reasons that will become apparent to those skilled in the art upon reading and understanding the present specification, there is a need in the art for improved wear leveling in memories.

DETAILED DESCRIPTION

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Non-volatile memory can utilize different architectures including NOR and NAND. The architecture designation is derived from the logic used to read the devices. In NOR architecture, a logical column of memory cells is coupled in parallel with each memory cell coupled to a data line, such as those typically referred to as bit lines. In NAND architecture, a column of memory cells is coupled in series with only the first memory cell of the column coupled to a bit line.

Figure 1:
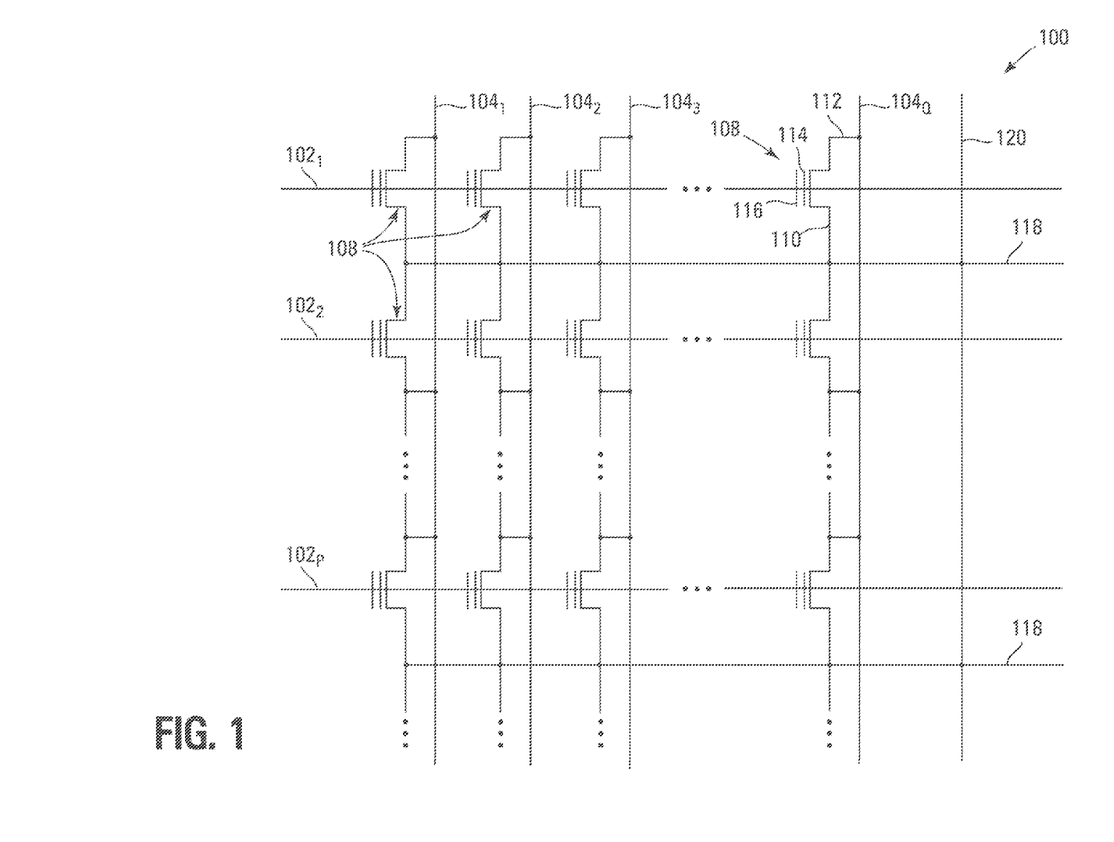
FIG. 1 is a schematic diagram of one embodiment of a portion of a NOR architecture memory array.

FIG. 1 is a schematic of a NOR memory array 100. Memory array 100 includes word lines $102_1$ to $102_P$ and intersecting local bit lines $104_1$ to $104_Q$. For ease of addressing in the digital environment, the number of word lines 102 and the number of bit lines 104 are each some power of two, e.g., 256 word lines 102 by 4,096 bit lines 104. The local bit lines 104 are coupled to global bit lines (not shown) in a many-to-one relationship.

Floating-gate transistors 108 are located at each intersection of a word line 102 and a local bit line 104. The floating-gate transistors 108 represent non-volatile memory cells for storage of data. Typical construction of such floating-gate transistors 108 includes a source 110 and a drain 112, a floating gate 114, and a control gate 116.

Floating-gate transistors 108 having their control gates 116 coupled to a word line 102 typically share a common source depicted as array source 118. As shown in FIG. 1, floating-gate transistors 108 coupled to two adjacent word lines 102 may share the same array source 118. Floating-gate transistors 108 have their drains 112 coupled to a local bit line 104. A column of the floating-gate transistors 108 includes those transistors commonly coupled to a given local bit line 104. A row of the floating-gate transistors 108 includes those transistors commonly coupled to a given word line 102.

To reduce problems associated with high resistance levels in the array source 118, the array source 118 is regularly coupled to a metal or other highly conductive line to provide a low-resistance path to ground. The array ground 120 serves as this low-resistance path.

In a typical prior art programming of the memory array, each memory cell is individually programmed as either a single level cell (SLC) or a multiple level cell (MLC). A cell's threshold voltage (Vt) can be used as an indication of the data stored in the cell. For example, in an SLC memory device, a Vt of 2.5V might indicate a programmed cell while a Vt of −0.5V might indicate an erased cell. In an MLC memory device, multiple Vt ranges can each indicate a different state by assigning a bit pattern to a specific Vt range.

Figure 2:
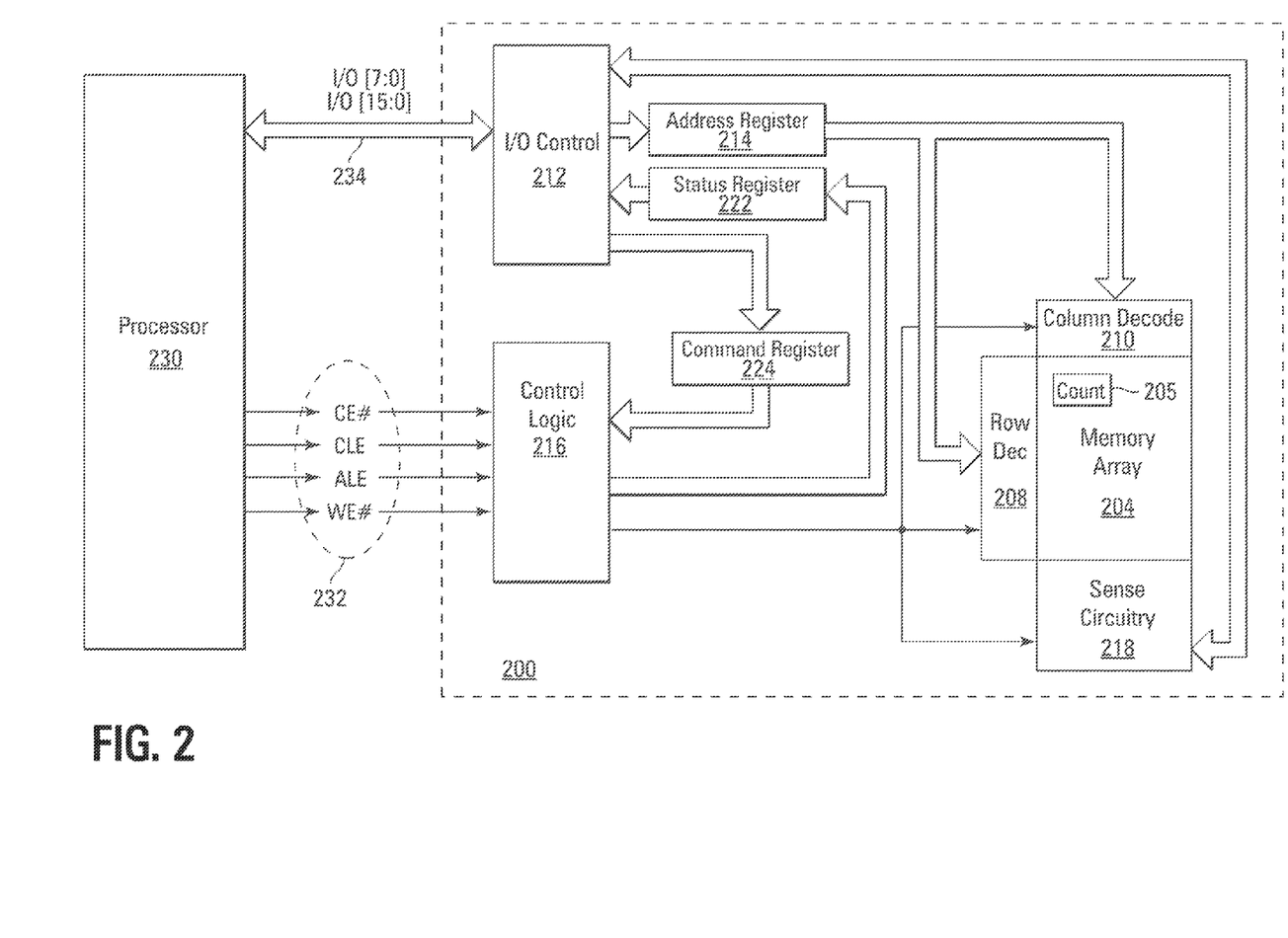
FIG. 2 is a block schematic of an electronic system in accordance with an embodiment of the disclosure.

FIG. 2 is a simplified block diagram of a first apparatus in the form of a memory device 200 in communication with a second apparatus, in the form of a processor 230, as part of a third apparatus, in the form of an electronic system, according to an embodiment. Some examples of electronic systems include computer servers, network devices, personal computers, personal digital assistants (PDAs), digital cameras, digital media players, digital recorders, games, appliances, vehicles, wireless devices, cellular telephones and the like. The processor 230 may be a memory controller or other external host device.

Memory device 200 includes an array of memory cells 204 logically arranged in rows and columns. Memory cells of a logical row are typically coupled to the same access line (commonly referred to as a word line) while memory cells of a logical column are typically selectively coupled to the same data line (commonly referred to as a bit line). A single access line may be associated with more than one logical row of memory cells and a single data line may be associated with more than one logical column.

A row decode circuitry 208 and a column decode circuitry 210 are provided to decode address signals. Address signals are received and decoded to access the array of memory cells 204. Memory device 200 also includes input/output (I/O) control circuitry 212 to manage input of commands, addresses and data to the memory device 200 as well as output of data and status information from the memory device 200. An address register 214 is in communication with I/O control circuitry 212 and row decode circuitry 208 and column decode circuitry 210 to latch the address signals prior to decoding. A command register 224 is in communication with I/O control circuitry 212 and control logic 216 to latch incoming commands. I/O control circuitry 212 in one embodiment contains a block mapping unit for remapping logical addresses.

In one embodiment, control logic 216, I/O control circuitry 212 and/or firmware or other circuitry can individually, in combination, or in combination with other elements, form an internal controller. As used herein, however, a controller need not necessarily include any or all of such components. In some embodiments, a controller can comprise an internal controller (e.g., located on the same die as the memory array) and/or an external controller.

Control logic 216 controls access to the array of memory cells 204 in response to the commands and generates status information for the external processor 230. The control logic 216 is in communication with row decode circuitry 208 and column decode circuitry 210 to control the row decode circuitry 208 and column decode circuitry 210 in response to the addresses. Array 204 in one embodiment includes counter space 205 for keeping program/erase cycle counts as described herein. In another embodiment, counter space 205 is not within array 204 but elsewhere in memory device 200.

A status register 222 is in communication with I/O control circuitry 212 and control logic 216 to latch the status information for output to the processor 230. Status register 222 may include a ready/busy register. For example, a 1-bit register could be used to indicate whether the memory device 200 is busy (e.g., that the memory device 200 is performing an access operation) or ready (e.g., that the memory device 200 has completed, or is not performing, an access operation). Thus, reading the status register 222, such as by the processor 230 or the control logic 216, could be used to determine whether the memory device 200 is involved in an access operation or not, e.g., whether or not the memory device is ready to initiate an access operation. Alternatively, or in addition, the control logic 216 of memory device 200 might provide a ready/busy (R/B#) signal to provide an indication to processor 230 of whether or not the memory device 200 is involved in an access operation. For example, memory devices often provide a pin (e.g., a pin of control link 232) that is asserted to a logic low, for example, when the device is involved in an access operation and is pulled up to a logic high when the device is again available (e.g., not involved in an access operation).

Memory device 200 receives control signals at control logic 216 from processor 230 over a control link 232. The control signals may include at least a chip enable CE#, a command latch enable CLE, an address latch enable ALE, and a write enable WE#. Additional control signals (not shown) may be further received or provided over control link 232 depending upon the nature of the memory device 200. Memory device 200 receives command signals (which represent commands), address signals (which represent addresses), and data signals (which represent data) from processor 230 over a multiplexed input/output (I/O) bus 234 and outputs data to processor 230 over I/O bus 234.

For example, the commands are received over input/output (I/O) pins [7:0] of I/O bus 234 at I/O control circuitry 212 and are written into command register 224. The addresses are received over input/output (I/O) pins [7:0] of bus 234 at I/O control circuitry 212 and are written into address register 214. The data are received over input/output (I/O) pins [7:0] for an 8-bit device or input/output (I/O) pins [15:0] for a 16-bit device at I/O control circuitry 212 and are written into sense circuitry (e.g., sense amplifiers and page buffers) 218. Data, e.g., from the array of memory cells 204 or the status register 222, are also output over input/output (I/O) pins [7:0] for an 8-bit device or input/output (I/O) pins [15:0] for a 16-bit device.

It will be appreciated by those skilled in the art that additional circuitry and signals can be provided, and that the electronic system of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2.

Additionally, while specific I/O and command pins are described in accordance with popular conventions for receipt and output of the various signals, it is noted that other combinations or numbers of pins may be used in various embodiments.

In ordinary memories, hierarchy stops at the block level. It is not possible to erase a section smaller than a block. Some new memories (e.g., page flash memories) are erasable on a level smaller than a block. For example, a sub-sector of a block is erasable in some memories. However, in such memories, all sub-sectors in a block share a physical column, but have separate program/erase access. As such, each sub-sector also has separate cycling and wear statistics. In page flash memories, each access in a program/erase operation to a sub-sector produces some effect on the other sub-sectors sharing the same block, in terms of data integrity. This data degradation affects wear leveling on the sub-sector level.

Sub-sector wear leveling may be implemented in a number of ways. For example, sub-sector wear leveling could be hierarchical, such as in traditional block wear leveling, but extended to the sub-sector level. This technique would swap sub-sectors locally to within a block. This would require a large hardware overhead due to adding a block mapping unit to each block. Another sub-sector wear leveling technique is to swap sub-sectors as if they were blocks. This, however, would require a large increase in the required swapping pool and complex management of block level operation. All sub-sectors would be in the swapping pool, so for a memory with 256 blocks each having 16 sub-sectors, the swapping pool would be 4096 sub-sectors. An additional drawback of swapping the sub-sectors directly is that some operations will then be performed on whole blocks. Supplementary hardware and/or software may be necessary to recollect all the sub-sectors belonging to the block address in the operation.

In a sub-sector for block wear leveling as in the present disclosure, a block is swapped when a sub-sector of that block reaches a point where it is indicated for wear leveling. Sub-sectors are monitored for wear conditions, according to a limit of program/read/erase cycles or the like, and when wear leveling is indicated for a sub-sector, management is on a block level. Each sub-sector has a record and wear-out evaluation. This is accomplished in one embodiment by monitoring cycle count, or a sum of sub-sector cycle counts in the block containing the sub-sector. For each sub-sector, a cycle counter (a few columns for example) is used to count cycles for the sub-sector.

When a sub-sector is indicated for a swap, on the current erase command, a swap of the block containing the sub-sector is performed. Issues in such a block for sub-sector swap include extra memory area in which to save sub-sector data that is not to be erased, that is, non-blank sub-sectors. This is not a problem in a traditional wear leveling on a block level, since the operation is a block erase, and all data in the block is erased. However, on a sub-sector level, there may be non-blank sub-sectors within the block that are to be saved on a sub-sector erase.

Figure 3:
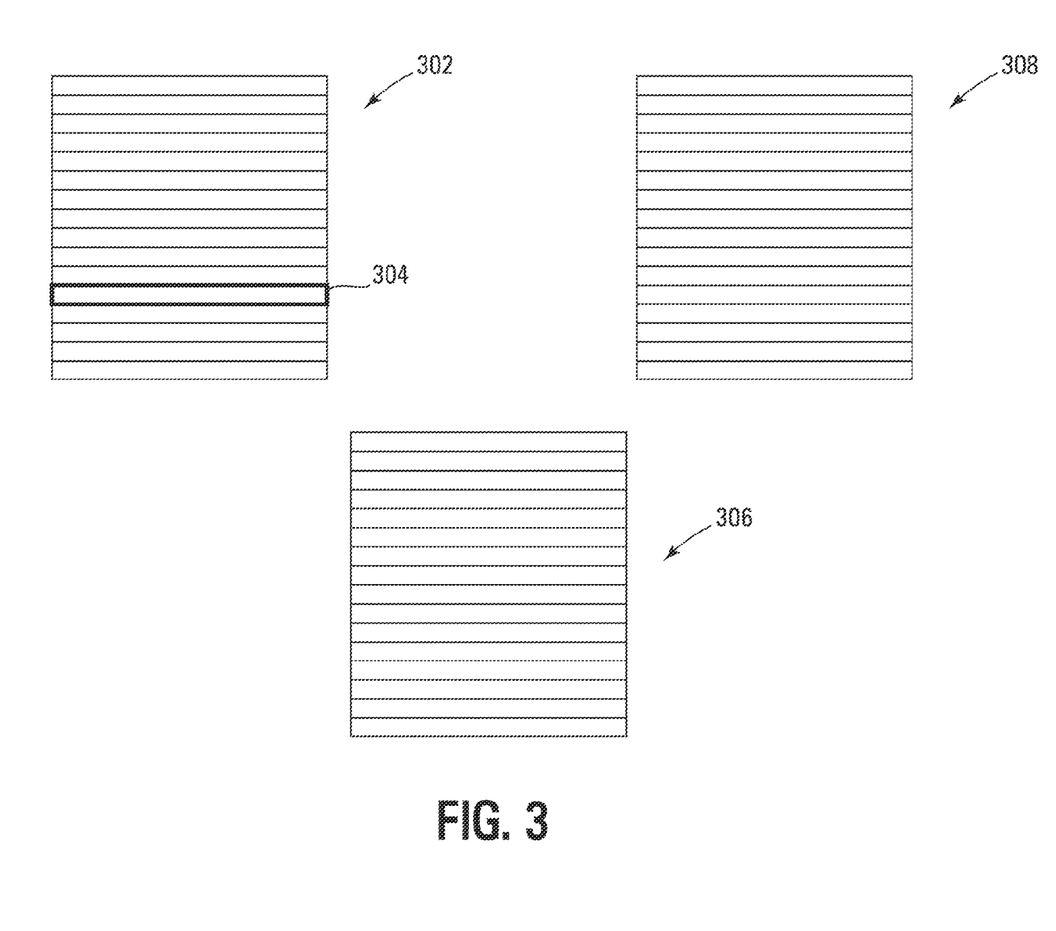
FIG. 3 is a block diagram of a portion of a memory device according to an embodiment of the present disclosure.

A visual representation of blocks to be swapped is shown in FIG. 3. A high-cycled block 302 has a sub-sector 304 that is to be wear leveled. A low-cycled block 306 and a backup block 308 that is erased on swapping are also present. In one embodiment, the backup block is a hidden block that is not accessible to a user, but is used in the sub-sector swap process.

Figure 4:
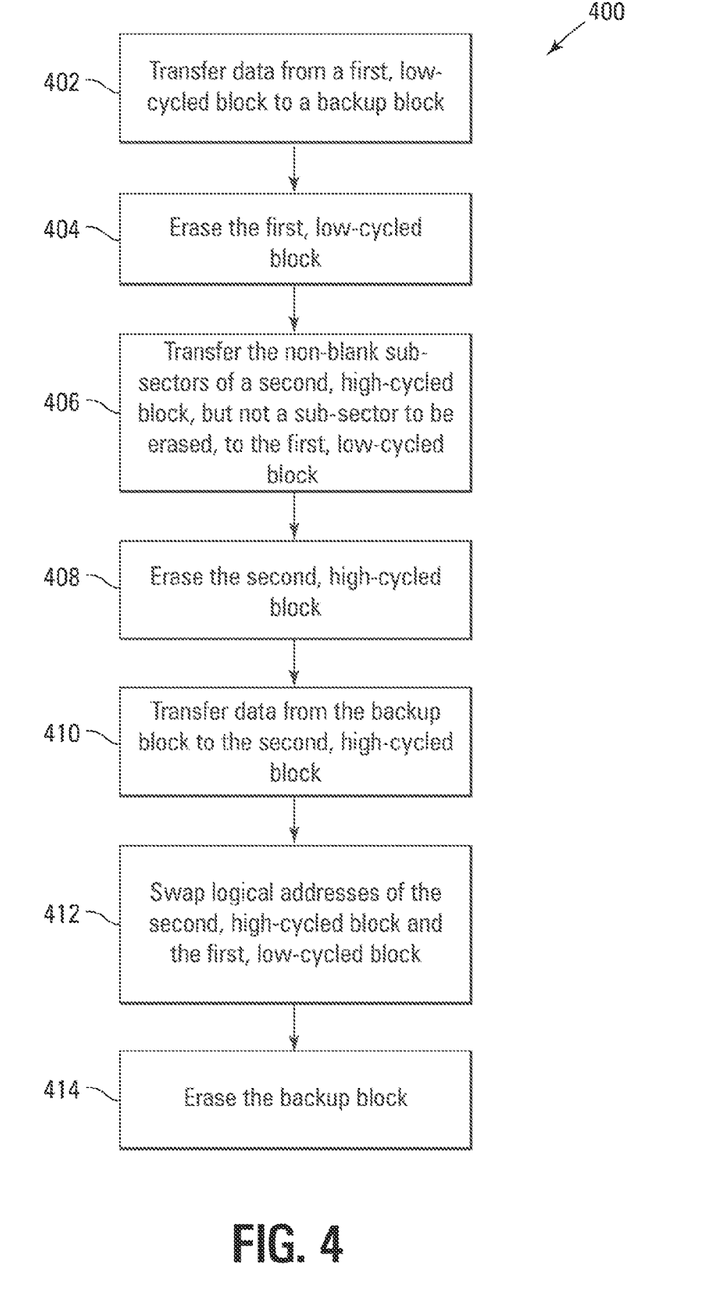
FIG. 4 is a flow chart diagram of a method according to an embodiment of the present disclosure.

One embodiment 400 of the present disclosure for wear leveling on a sub-sector level is shown in flow chart form in FIG. 4. Method 400 for wear leveling comprises transferring data from a first, low-cycled block (e.g., block 306) to a backup block (e.g., block 308) at 402, erasing the first, low-cycled block 306 in block 404, transferring the non-blank sub-sectors of a second, high-cycled block (e.g., block 302), but not a sub-sector to be erased (e.g., sub-sector 304), to the first, low-cycled block 306 at 406, and erasing the second, high-cycled block 302 at 408. Following erasing of the second, high-cycled block 302, data is transferred from the backup block 308 to the second, high-cycled block 302 at 410, the logical addresses of the second, high-cycled block 302 and the first, low-cycled block 306 are swapped at 412, and the backup block 308 is erased at 414.

In this block for sub-sector swap, three erase cycles are used, three data transfer operations are performed, and one address swap is performed. Since erase operations take relatively large amounts of time compared to other functions, three erase operations are likely to be considered too many for modern applications. Further, the backup block in this method may not be a low-cycled block, as it may be used repeatedly for many block swap operations. Finally, the logical address swap is performed at the end of the operation, creating potential power-loss issues during a wear leveling operation. For example, should a power-loss event occur during the process, an unrecoverable error may occur. So, while the method 400 successfully wear levels on a sub-sector basis, additional time savings are desirable.

Figure 5:
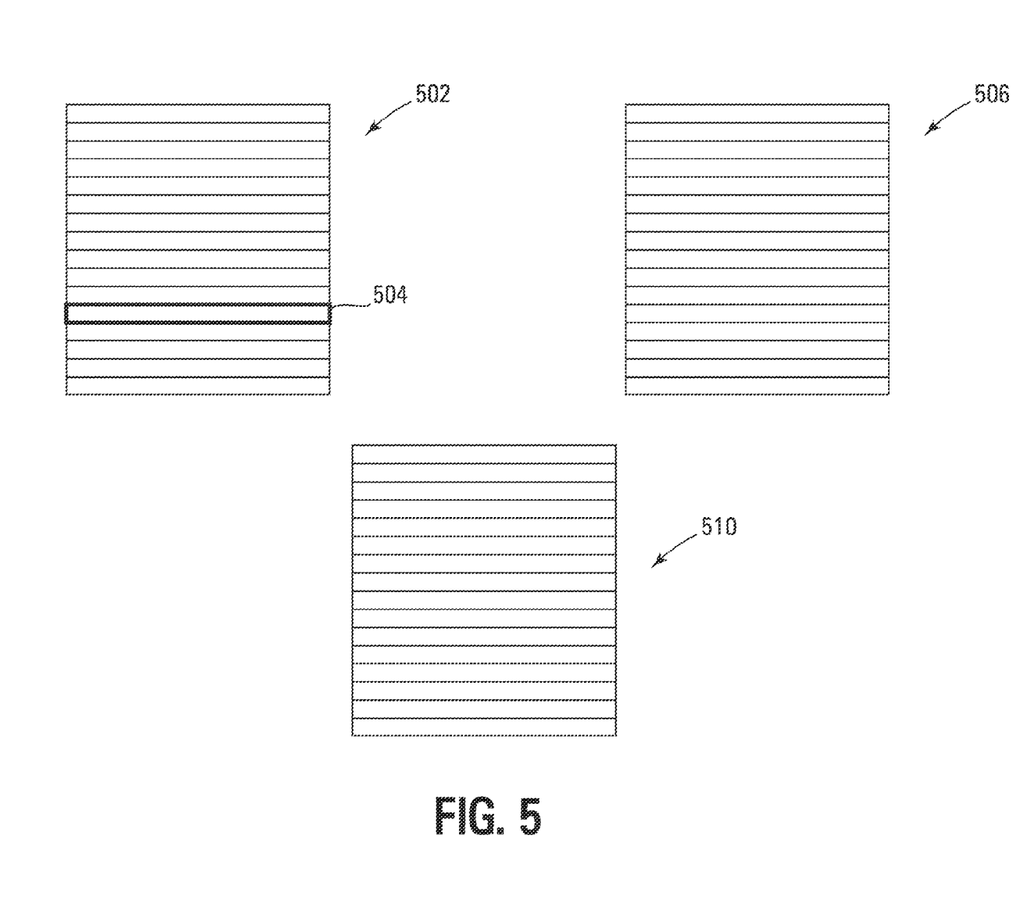
FIG. 5 is a block diagram of a portion of a memory device according to another embodiment of the present disclosure.

A visual representation of blocks to be swapped in another embodiment is shown in FIG. 5. A first, high-cycled block 502 has a sub-sector 504 that is to be wear leveled. A second block 506 that is erased on swapping and a third, low-cycled block 510 are also present. In one embodiment, the second block is initially a hidden block which is a part of the block swapping pool. After swapping, the second block becomes accessible to a user. The initial third block becomes the new hidden block after the swap.

Figure 6:
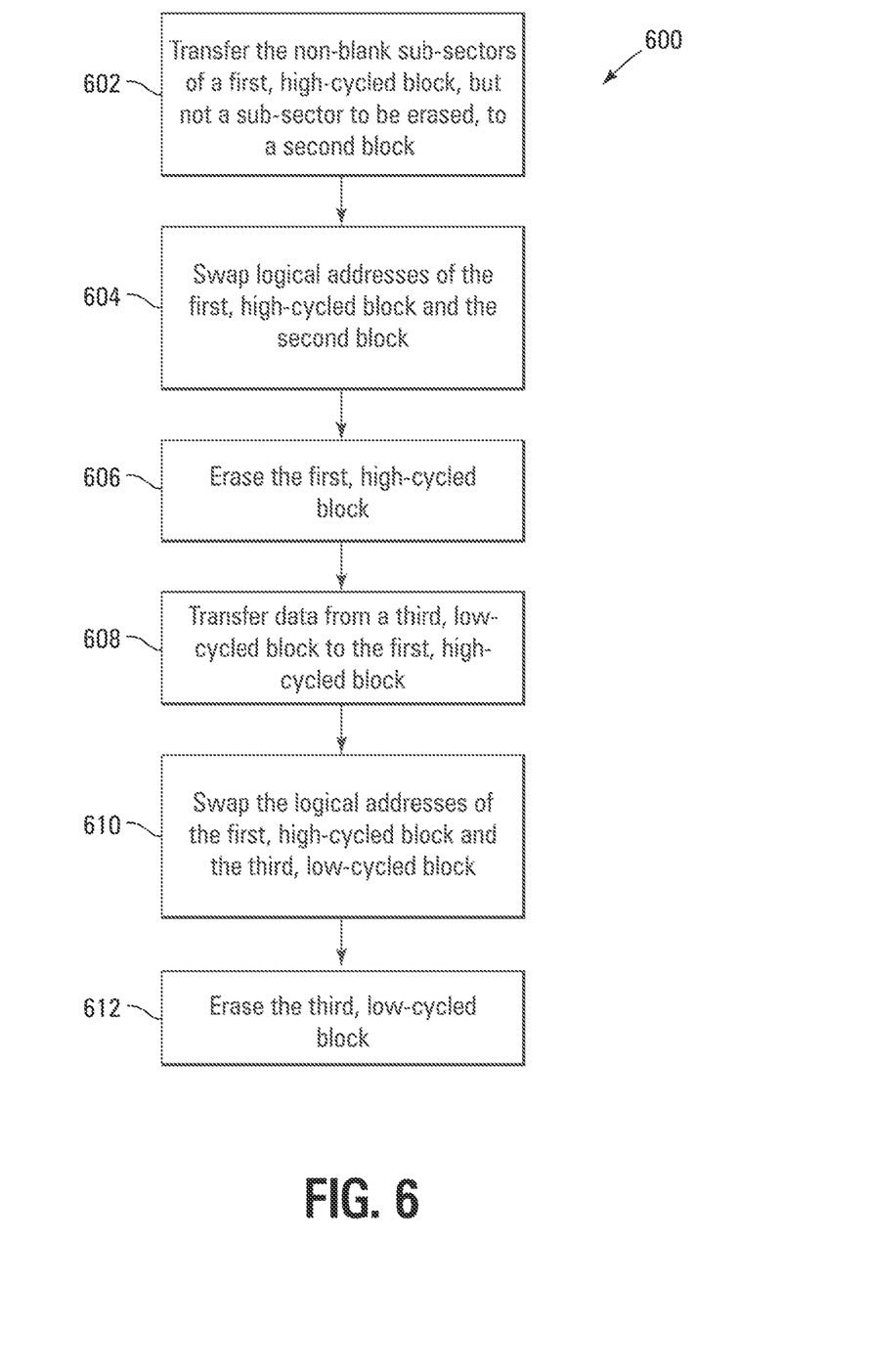
FIG. 6 is a flow chart diagram of a method according to another embodiment of the present disclosure.

Another embodiment 600 of a method for wear leveling on a sub-sector basis is shown in FIG. 6. Method 600 comprises transferring non-blank sub-sectors of a first, high-cycled block (e.g., block 502), but not a sub-sector to be erased, to a second block (e.g., block 506) at 602, swapping logical addresses of the first, high-cycled block 502 and the second block 506 at 604, erasing the first, high-cycled block 502 at 606, and transferring data from a third, low-cycled block (e.g., block 510) to the first, high-cycled block 502 at 608. Following transferring of data from the third, low-cycled block 510 to the first, high-cycled block 502, the logical addresses of the first, high-cycled block 502 and the third, low-cycled block 510 are swapped at 610, and the third, low-cycled block 510 is erased at 612. At the completion of the swap operation, the original first, high-cycled block 502 holds the original contents of the third, low-cycled block 510, the original second block 506 contains the non-erased contents of the original first, high-cycled block 502, and the original third block 510 is an erased new second block.

In this block for sub-sector swap, two erase cycles are used, two data transfer operations are performed, and two address swaps are performed. As a typical block swap operation also takes two erase cycles, there is no time penalty to the method 600 over current operation time. However, as applications demand faster operation, performance that only matches but does not exceed typical swap operation speed may not be acceptable. In one embodiment, when no accessible blank blocks are available, the high-cycled block swaps with the third block, which is the less-cycled block in only in the 50% of the cases. The third block will be an almost-less cycled block in the other cases. This does not substantially impact wear leveling.

To improve the speed of a wear leveling operation, one embodiment performs portions of the wear leveling of method 600 as background operations. In one embodiment, the swap process is segmented and tracked so that certain portions may be performed in the background, and so that recovery in the event of a power-loss may be improved. As it is used in this specification, background operation means operation when the memory device indicates it is busy performing a different, unrelated, operation, and foreground operation means operation when the memory device indicates that it is busy. In one embodiment, background operation entails performing parts of the wear leveling operation by extending the time of subsequent user erase operations, and using that extended time to perform a part of the wear leveling operation.

Background operation may be implemented for portions of wear leveling operations that occur after the data from the block containing the sub-sector to be erased is copied to a new block, and the remapping of that block has been done. The erase at that point appears complete to a user, and at that time, operations may be put in the background. The subsequent cleanup of the additional block copy and erase may also be done in the background. These portions may include erase, data transfer, and logical address swaps. For example, after an erase operation involving the third block of FIG. 5 and method 600, there is a strong likelihood that successive erase requests will not use a swap operation, allowing time to continue the swap process in the background. Should an erase event require a swap operation before a running background operation is complete, the swap request is in one embodiment postponed. This leaves one block to some degree overworn for a short period of time. However, given the timing of operations in a memory device, the overworn block will not be affected by adverse data issues as background erase events will typically be completed within a few foreground erase events. That is, once a block swap has been completed to the erasure of the first block, subsequent portions of the process may be performed in the background, that is, background operations are appended to the busy time of a subsequent operation.

Referring back to method 600, background operation of the memory device is performed as follows. Once the erase operation for the first bock is completed, a read of data may be performed while the transfer of data from the third block to the first block, swapping logical addresses of the first and the third blocks, and erasure of the third block are performed in the background, since all data that are to be read are available except during the short time it takes to swap logical addresses As long as the erase operation on the third block is completed before a subsequent block swap request, background operations can continue without affecting operation of the memory. In one embodiment, when a block that is ready to be wear leveled triggers a wear leveling event and a background operation is occurring, the block is marked using a non-volatile bit within the block. The next erase operation for that block checks if the block is marked. If the block is marked, the erase operation proceeds with wear leveling without further evaluation.

This background operation reduces the number of erase cycles that are visible to a user while the memory device indicates it is busy, that is, in the foreground. With background operation, only one transfer operation and one erase operation are performed as operations visible to a user. Background operation manages segmentation of a sub-sector block swap so that some operations are performed in the background. By performing some operations in the background, any single operation is prevented from being extended by too much. If all the swap operations were performed on a single user operation, there would be two erase operations and two block copy operations happening in response to a single user operation. Background operation reduces this to as little as a single block copy operation happening during the original user command, while the two erase operations and additional block copy operation can be distributed across the current operation and one or more subsequent user operations. The overall busy time of the device is not reduced, but no single user operation is grossly extended by the swap event.

Methods for power loss management in a method such as method 600 may also be segmented. Segmentation of power loss management operations allows recovery from a power loss without data loss, and without having to start an entire operation over. Power loss management may be performed with or without background operation.

Figure 7:
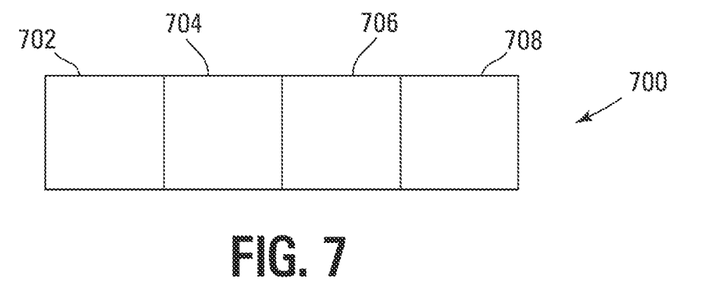
FIG. 7 is a block diagram of a tracker area according to an embodiment of the present disclosure.

Power loss management generally includes storing a plurality of tracker bits in a non-volatile area of a memory for certain milestones along the operation of a sub-sector block swap, so that a swap operation can recover from the last milestone reached before a power loss event. An example of a tracker area 700 is shown in FIG. 7. Tracker area comprises in one embodiment four tracker bits 702, 704, 706, and 708. Tracker bits 702 and 706 are set for completion of a block copy phase of a wear leveling operation, and tracker bits 704 and 708 are set for completion of an erase phase of a wear leveling operation.

Figure 8:
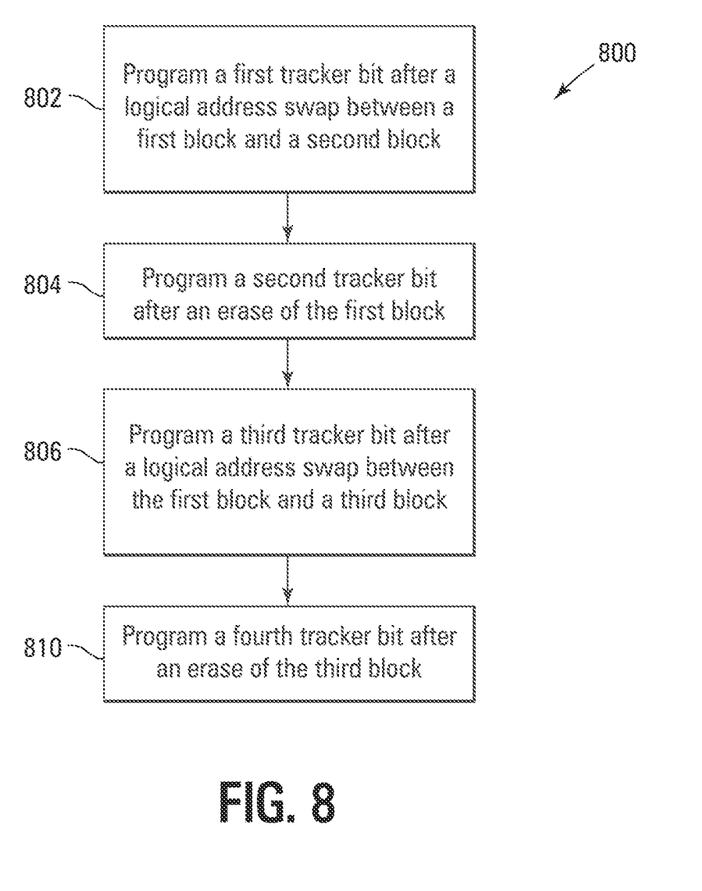
FIG. 8 is a flow chart diagram of a power loss management embodiment of the present disclosure.

One embodiment 800 of power loss management for a method such as method 600 is shown in flow chart form in FIG. 8. Method 800 comprises programming a first tracker bit after a logical address swap between a first block and a second block at 802, programming a second tracker bit after an erase of the first block at 804, programming a third tracker bit after a logical address swap between the first block and a third block at 806, and programming a fourth tracker bit after an erase of the third block at 810. If a swap operation is interrupted by a power loss event, the interrupted swap operation can be recovered, for example, at power up, on command, or as a background operation. The last phase of the swap operation from which the operation can be recovered is stored in the non-volatile tracker section as a programmed tracker bit. If an operation that is not at the end of a phase that triggers programming of a tracker bit is not completed, then that phase may be restarted from the operation immediately subsequent to the phase indicated as completed by the last programmed tracker bit.

Figure 9:
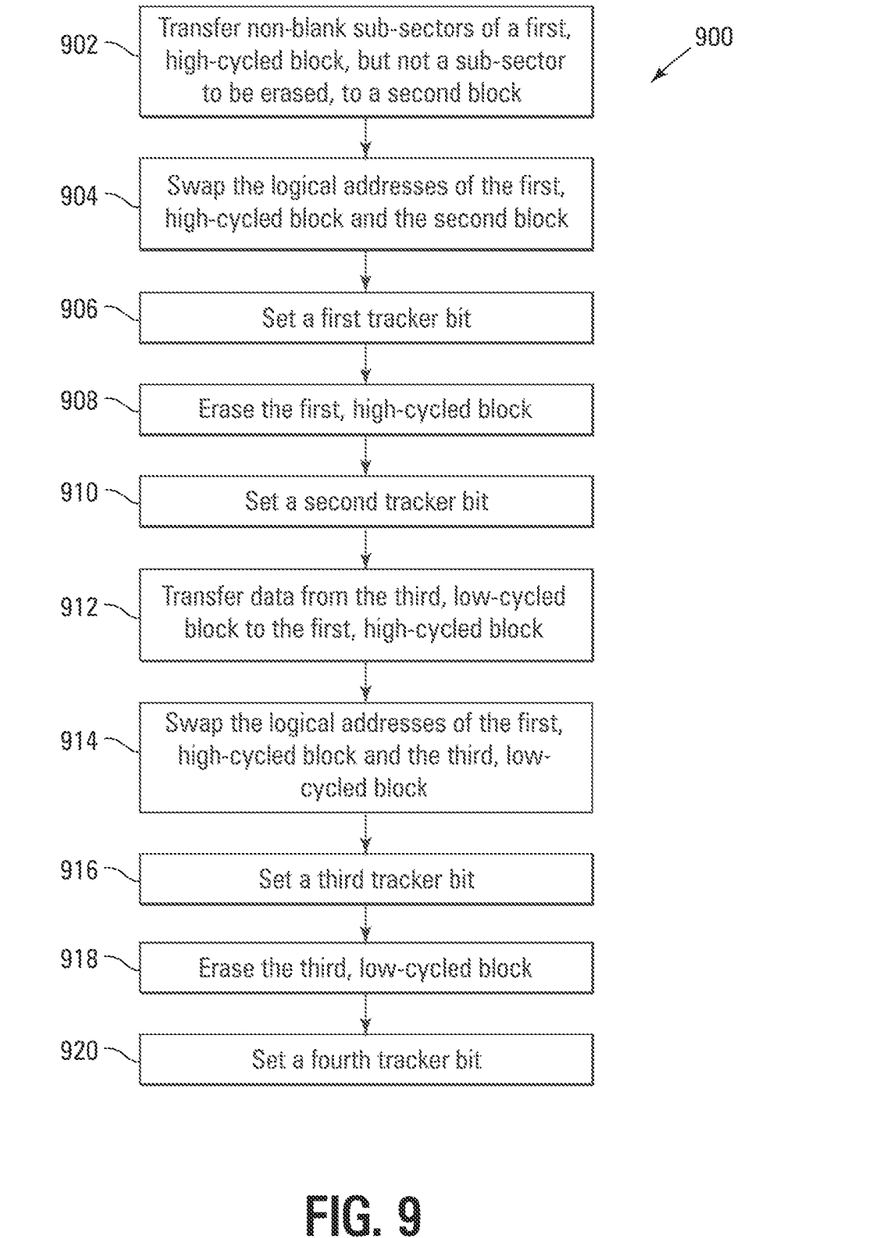
FIG. 9 is a flow chart diagram of a wear leveling method with power loss management according to yet another embodiment of the present disclosure.

The flow chart of FIG. 9 shows an embodiment of a method 900 showing integration of method 600 and method 800. Method 900 comprises transferring non-blank subsectors of a first, high-cycled block (e.g., block 502), but not a sub-sector to be erased, to a second block (e.g., block 506) at 902, swapping the logical addresses of the first, high-cycled block and the second block at 904, setting a first tracker bit at 906, erasing the first, high-cycled block at 908, setting a second tracker bit at 910, and transferring data from the third, low-cycled block (e.g., block 510) to the first, high-cycled block at 912. Following transferring of data from the third, low-cycled block to the first, high-cycled block, the logical addresses of the first, high-cycled block and the third, low-cycled block are swapped at 914, a third tracker bit is set at 916, the third, low-cycled block is erased at 918, and a fourth tracker bit is set at 920. At the completion of certain phases of the swap operation, a corresponding tracker bit indicating completion of that phase is programmed. In another embodiment, additional bits may be added to the tracker to enable tracking of additional operations.

CONCLUSION

In summary, one or more embodiments of the disclosure show wear leveling of sub-sectors within blocks in a memory device. This is accomplished, for example, by swapping a block when a sub-sector is to be wear leveled, and includes swapping a high-cycled block with a low-cycled block. Further operation performs at least a part of the swap operation in the background. Tracker bits are used in one embodiment to track progress of the swap operation for recovery from a power loss event.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:

1. A method of wear leveling in a memory, comprising:
monitoring wear conditions for each sub-sector of a plurality of sub-sectors of a particular block of the memory, wherein each sub-sector of the plurality of sub-sectors shares a same physical column, wherein each sub-sector of the pluralityof sub-sectors has separate program/erase access, and wherein each sub-sector of the plurality of sub-sectors has separate wear statistics;
determining that the monitored wear conditions indicate one of the sub-sectors of the plurality of sub-sectors for wear leveling; and
in response to a command to perform a sub-sector erase within the particular block when the monitored wear conditions indicate the one of the sub-sectors of the plurality of sub-sectors for wear leveling:
transferring data from a first block of the memory to a second block of the memory;
erasing the first block;
transferring data from the particular block of the memory to the first block, excluding a sub-sector of the particular block that is to be erased in response to the command to perform a sub-sector erase within the particular block;
erasing the particular block;
transferring data from the second block to the particular block;
swapping logical addresses for the first block and the particular block with each other; and
erasing the second block.

2. The method of claim 1, wherein the first block is a low cycle count block.

3. The method of claim 1, wherein the second block is an empty block.

4. The method of claim 3, wherein the second block is a hidden block inaccessible to a user of the memory.

5. The method of claim 1, wherein the particular block is a high cycle count block.

6. The method of claim 1, further comprising segmenting the wear leveling.

7. The method of claim 6, wherein segmenting the wear leveling comprises erasing the second block in a background operation.

8. The method of claim 1, further comprising:
setting a tracker bit in a non-volatile storage area of the memory after completion of an event;
wherein the event is selected from the group consisting of transferring data from the first block to the second block, erasing the first block, transferring data from the particular block to the first block, erasing the particular block, swapping logical addresses for the first block and the particular block with each other, and erasing the second block.

9. The method of claim 8, further comprising:
setting a respective tracker bit in the non-volatile storage area after completion of a corresponding event for more than one event selected from the group consisting of transferring data from the first block to the second block, erasing the first block, transferring data from the particular block to the first block, erasing the particular block, swapping logical addresses for the first block and the particular block with each other, and erasing the second block.

10. The method of claim 9, further comprising restarting wear leveling at a point in the wear leveling after the last set tracker bit in the non-volatile storage area after a power loss.

11. The method of claim 1, wherein transferring data from the particular block to the first block comprises transferring data from non-blank subsectors of the particular block that are to be saved on erase of the sub-sector of the particular block that is to be erased in response to the command to perform the sub-sector erase within the particular block.

12. A method of wear leveling in a memory, comprising:
monitoring wear conditions for each sub-sector of a respective plurality of sub-sectors for each block of a plurality of blocks of the memory, wherein each sub-sector of the respective plurality of sub-sectors for each block of the plurality of blocks shares a same physical column of its respective block, wherein each sub-sector of the respective plurality of sub-sectors for each block of the plurality of blocks has separate program/erase access, and wherein each sub-sector of the respective plurality of sub-sectors for each block of the plurality of blocks has separate wear statistics;
determining that the monitored wear conditions indicate one of the sub-sectors of the respective plurality of sub-sectors of any block of the plurality of the blocks for wear leveling, and deeming that block of the plurality of blocks a high cycle count block; and
in response to a command to perform a sub-sector erase within the high cycle count block:
transferring data from a first, low cycle count, block of the memory to a second, empty, block of the memory;
erasing the first block;
transferring data from the high cycle count block of the memory to the first block, excluding a sub-sector of the high cycle count block that is to be erased in response to the command to perform the sub-sector erase within the high cycle count block;
erasing the high cycle count block;
transferring data from the second block to the high cycle count block;
swapping logical addresses for the first block and the high cycle count block with each other; and
erasing the second block.

13. The method of claim 12, wherein the second block is inaccessible to a user of the memory.

14. The method of claim 12, and further comprising:
setting a respective tracker bit for each event of transferring data from the first block to the second block, erasing the first block, transferring data from the high cycle count block to the first block, erasing the high cycle count block, swapping logical addresses for the first block and the high cycle count block with each other, and erasing the second block;
wherein each tracker bit is set after completion of its respective event and each set tracker bit is stored to a non-volatile storage area of the memory.

15. The method of claim 14, further comprising restarting wear leveling at a point in the wear leveling after the last set tracker bit in the non-volatile storage area after a power loss.

16. A memory, comprising:
an array of memory cell comprising a plurality of blocks, wherein each block of the plurality of blocks comprises a respective plurality of sub-sectors, wherein each sub-sector of the respective plurality of sub-sectors for each block of the plurality of blocks shares a same physical column of its respective block, wherein each sub-sector of the respective plurality of sub-sectors for each block of the plurality of blocks has separate program/erase access, and wherein each sub-sector of the respective plurality of sub-sectors for each block of the plurality of blocks has separate wear statistics; and
a controller for controlling access to the array of memory cells;
wherein the controller is configured to perform a method of wear leveling for the array of memory cells, the method comprising:
monitoring wear conditions for each sub-sector of the respective plurality of sub-sectors for each block of the plurality of blocks;
determining that the monitored wear conditions indicate one of the sub-sectors of the respective plurality of sub-sectors of any block of the plurality of blocks for wear leveling; and
in response to a command to perform a sub-sector erase within a block of the plurality of blocks when the monitored wear conditions indicate a sub-sector of respective plurality of sub-sectors of that block for wear leveling:
transferring data from a first block of the array of memory cells to a second block of the array of memory cells;
erasing the first block;
transferring data from a third block of the array of memory cells to the first block, wherein the third block is the block of the plurality of blocks containing the sub-sector that is to be erased in response to the command to perform the sub-sector erase, and wherein transferring the data from the third block to the first block excludes the sub-sector of the third block that is to be erased in response to the command to perform the sub-sector erase;
erasing the third block;
transferring data from the second block to the third block;
swapping logical addresses for the first block and the third block with each other; and
erasing the second block.

17. The memory of claim 16, wherein the first block is a low cycle count block, the second block is an empty block, and the third block is a high cycle count block.

18. The memory of claim 17, wherein the second block is inaccessible to a user of the memory.

19. The memory of claim 16, further comprising:
a non-volatile storage area for storage of one or more tracker bits;
wherein the controller is further configured to:
set a respective tracker bit for each of one or more events selected from the group consisting of transferring data from the first block to the second block, erasing the first block, transferring data from the third block to the first block, erasing the third block, swapping logical addresses for the first block and the third block with each other, and erasing the second block; and
set each tracker bit of the one or more tracker bits after completion of its respective event; and
store each set tracker bit to the non-volatile storage area.

20. The memory of claim 19, wherein the controller is further configured to restart wear leveling at a point in the wear leveling after the last set tracker bit in the non-volatile storage area after a power loss.

* * * * *